Dec. 20, 1960

C. C. REETZ 2,964,818

MOLDING MACHINE FOR CEMENTITIOUS ARTICLES

Filed May 13, 1959

INVENTOR.
CLEMENT C. REETZ
BY

*Salvatore G. Militana,*
ATTORNEY

Dec. 20, 1960 C. C. REETZ 2,964,818
MOLDING MACHINE FOR CEMENTITIOUS ARTICLES
Filed May 13, 1959
3 Sheets-Sheet 3
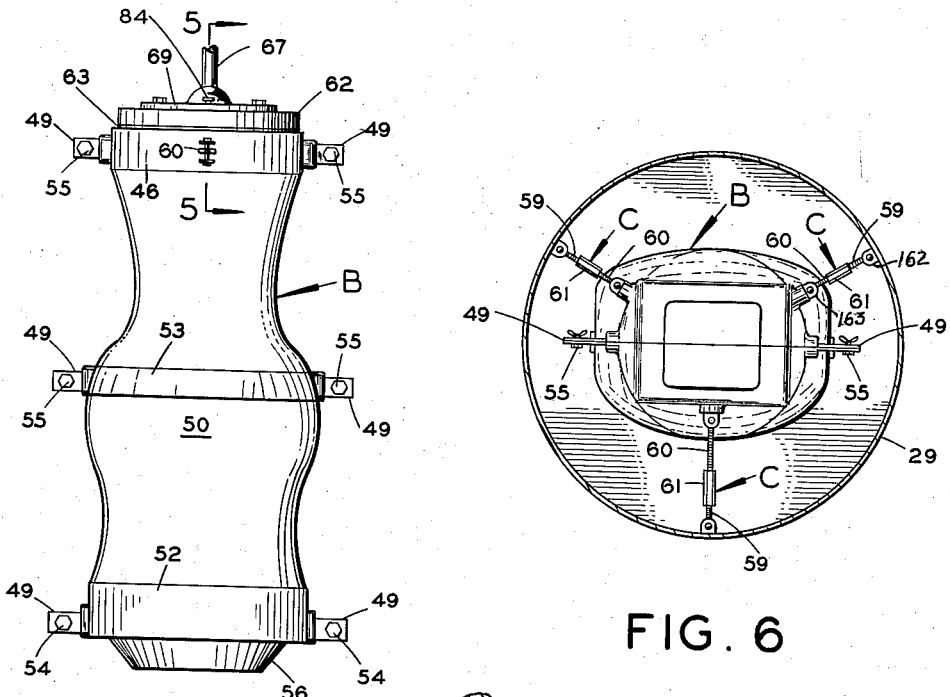
FIG. 4
FIG. 6
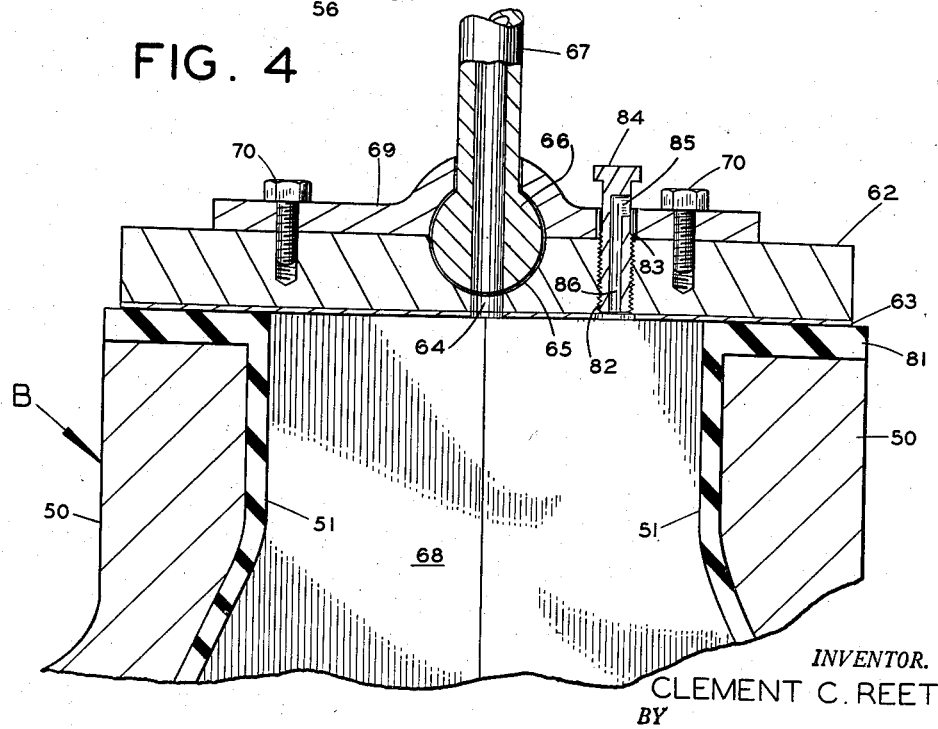
FIG. 5
INVENTOR.
CLEMENT C. REETZ
BY
Salvatore G. Militana
ATTORNEY

United States Patent Office

2,964,818
MOLDING MACHINE FOR CEMENTITIOUS ARTICLES

Clement C. Reetz, 208 Apache St., Miami Springs, Fla.

Filed May 13, 1959, Ser. No. 812,835

2 Claims. (Cl. 25—41)

The present invention relates generally to molding devices and is more particularly directed to molding machines for producing cementitious articles and the like.

At the present time very little if any, cementitious articles such as statuary and the like are being produced by hand labor or machinery that is comparable with hand sculptured statuary. The reason for this is that cementitious material commonly known as mortar is difficult to work with whether the mix used is dry, moderately wet or very wet. If the mix is dry then there is the problem of getting the mortar into all parts of a mold and compacting it sufficiently to produce a smooth outer surface on the article being produced. If the mortar is wet, the mold will be readily filled but there will result blemishes and flaws in the article being produced because of the failure to remove air and water bubbles entrapped in the mortar. Consequently any articles produced in molds with cementitious materials are expensive and not of high quality since a great deal of hand labor is required to patch up the visible flaws, etc.

The present invention contemplates the production of cementitious articles with a wet mix of mortar wherein the moisture is completely withdrawn therefrom whereby the finished article will be perfectly formed without flaws or blemishes and has as its principal object the provision of a machine utilizing mass production methods capable of producing such articles.

A further object of the present invention is to provide a machine for producing cementitious articles having a rotatable mold support upon which a mold is mounted and rotated rapidly after being filled with a wet mix of mortar whereby the mortar is completely and adequately distributed throughout the mold and the moisture removed therefrom.

A further object of the present invention is the provision of a molding machine which utilizes centrifugal forces for extracting moisture from a wet mix of mortar.

A still further object of the present invention is to provide a machine for molding perfectly formed cementitious articles by using a wet mix of mortar and separating the moisture from the mortar by means of centrifugal forces and removing the moisture from the mold by suction pressure effected by a vacuum.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 4 is an elevational view of a mold and its support as seen removed from the molding machine.

Figure 5 is a detailed cross sectional view taken along the line 5—5 of Figure 4.

Figure 6 is a top plan view of the mold and inner cylinder with a cover plate removed from the mold.

Figure 1:
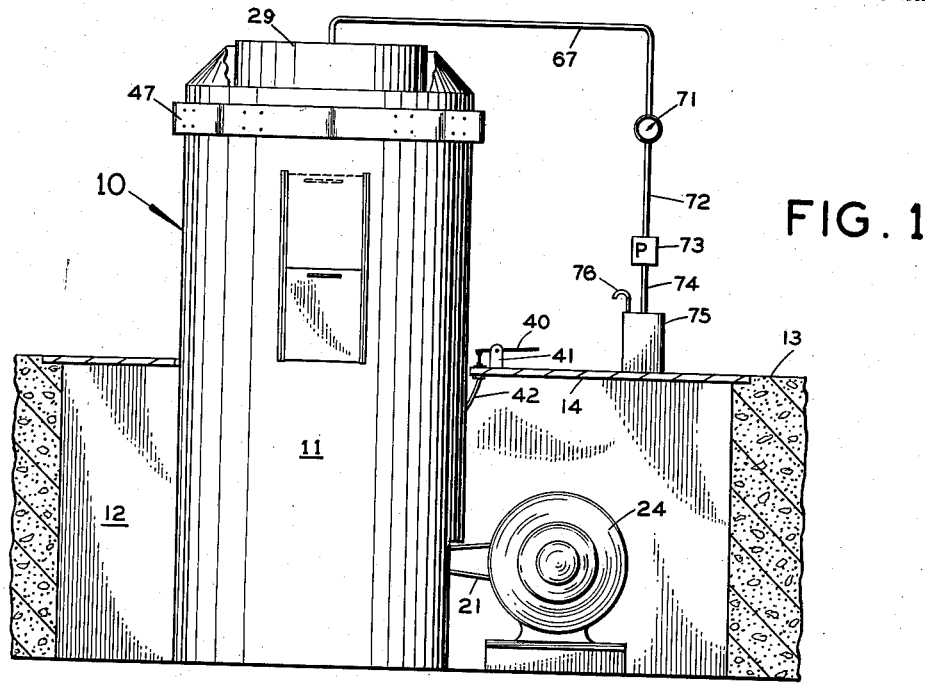
Figure 1 is a side elevational view of a statuary molding machine constructed in accordance with my invention.
Figure 2:
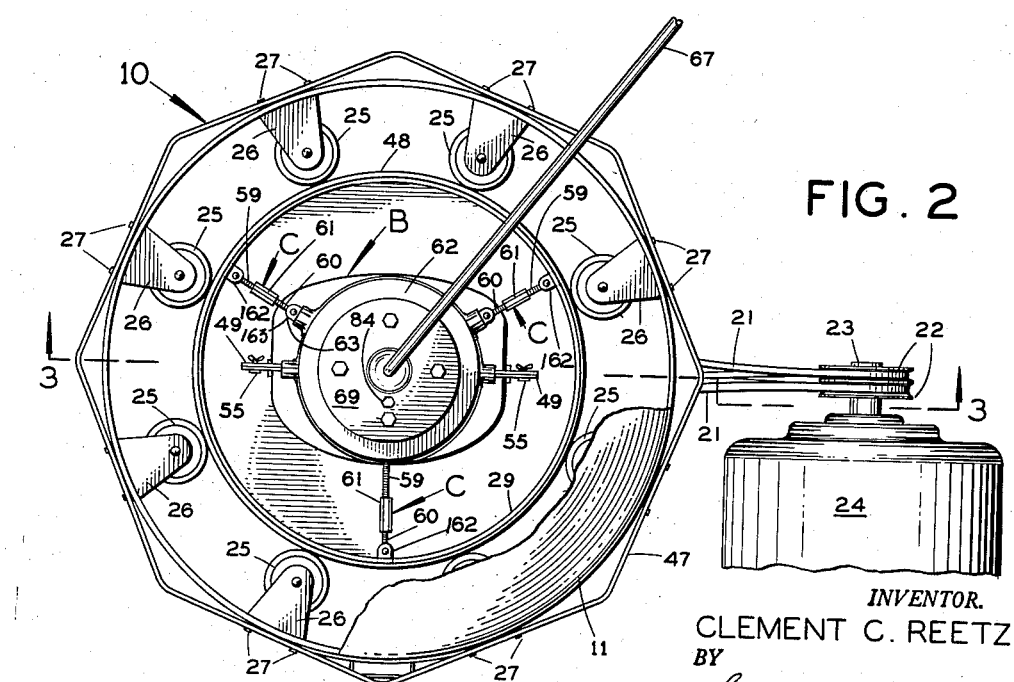
Figure 2 is a top plan view as seen with a cover and platform removed.
Figure 3:
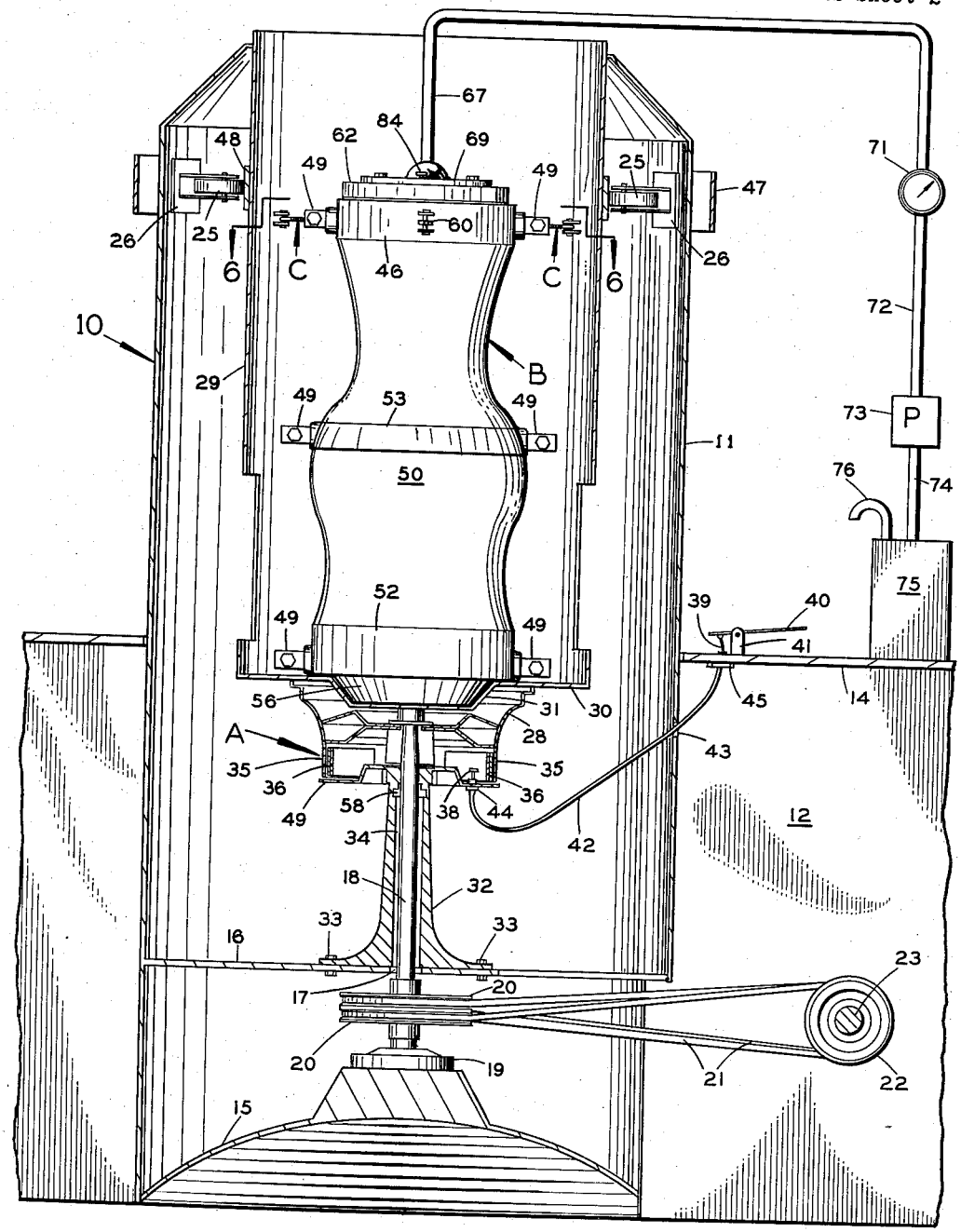
Figure 3 is a longitudinal sectional view taken along the line 3—3 of Figure 2.

Referring to the drawings wherein like numerals are used to designate similar parts throughout the several views, the numeral 10 refers generally to my molding machine which consists of a cylindrical housing 11 positioned in an upright manner in a well 12 formed in a floor 13. The well 12 is covered by a platform 14 to provide a support for the operator of the machine 10.

The cylindrical housing 11 is provided with a base member 15 and an intermediary base wall 16 mounted above the base member 15. The intermediary wall 16 is provided with a concentrically disposed opening 17 through which an upright rotatable shaft 18 extends, the shaft 18 being rotatably mounted on a thrust bearing 19 positioned on a base 20 that is mounted on the base member 15. Means are provided for rotating the shaft 18 comprising a pair of pulleys 20 secured concentrically on the shaft 18 and having a pair of endless belts 21 engaging the pulleys 20, 20. At their other end, the endless belts 21 engage pulleys 22 which are mounted on a shaft 23 of an electric motor 24. The motor 24 is connected to a source of electricity (not shown) for energizing the motor 24.

At the upper end portion of the shaft 18 for rotational movement therewith is a drum support member 28 on top of which is secured an inner cylindrical member or drum 29 whose base member 30 is provided with a concentrically disposed recessed portion 31, the function of which is described in detail hereinafter. The inner drum 29 is concentrically disposed within the outer drum or housing 11 and maintained substantially thusly by a plurality of hard rubber rollers 25 mounted on brackets 26 which are bolted as at 27 to the inner surface of the housing 11. The bolts 27 extend through a collar portion 47 which is secured to the outer surface of the housing 11 for reinforcing the latter. The rollers 25 engage a further collar portion 48 fitted about the rim of the inner drum 29 thereby maintaining the drum 29 centrally in position as it rotates very rapidly.

To control the rotational movement of the inner cylinder and shaft 18 as by slowing and stopping same, there is provided a braking mechanism A comprising a concentrically mounted pedestal 32 secured at its base portion to the intermediary base wall 16 by bolts 33 and provided with a centrally disposed bore 34 through which the rotatable shaft 18 extends with bearings 58 interposed between the shaft 18 and the pedestal 32. To the top portion of the pedestal 32 there is a brake drum 49 mounted having brake shoes 36 positioned in spaced relation to a depending wall 35 forming a part of the rotatable inner cylinder support 28. The braking mechanism A which is of conventional construction such as used in automobiles, shown here more or less diagrammatically, is provided with a cam 38 for actuating the brake shoes 36. The cam 38 is caused to be pivoted by a flexible cable 39 secured at one end to the cam 38 and the other end to a foot lever 40 which is pivotally mounted on a bracket 41 resting on the platform 14. The flexible cable 39 is encased in a tubular casing 42 that extends through an opening 43 in the cylindrical housing 11 and whose ends terminate at the brake drum 49 and the platform 14 where they are secured as at 44 and 45 respectively.

Within the inner drum 29 there is removably positioned a mold device B which consists of a mold backing or support 50 constructed of plaster of Paris or plastic as may be desired, and a mold 51 which is made of resilient material such as rubber, koroseal and the like. As is obvious to those learned in the art, the mold 51 and mold support 50 are constructed in two halves and when ready for use are joined and secured together by any appropriate fastening devices. As best seen in Figure 5, there is shown clamps 52 and 53 which encircle the mold support 50 at the base and mid-portion thereof respectively, and which are provided with flange portions 49 that are bolted together as at 54 and 55 respectively. A bottom portion 56 of the mold support 50 is tapered and shaped as shown to fit within the recess 31 of the base 30.

The upper portion of the mold support 50 is secured in position within the drum 29 as well as the two halves thereof held securedly together by a plurality of adjustable tie bars C. The adjustable tie bars C each consists of a pair of eye bolts 59 and 60 having reverse threads with a threaded sleeve 61 engaging the threaded portion of the eye bolts 59 and 60; the other ends of the eye bolts being pivotally secured to brackets 162 and 163 which are secured to the inner surface of the cylinder 29 and a collar 46 positioned about the mold support 50.

Means are provided for the removal of moisture from cementitious material placed in the mold 51 which moisture will tend to come to the surface of the rapidly revolving mold B comprising a plate 62 which rests on the upper portion 81 of the resilient mold 51 and a gasket 63 forming an airtight seal therein. The plate 62 is provided with a centrally disposed bore 64 and an arcuate recess 65 disposed on the upper portion of the plate 62 and connecting the bore 64. Rotatably disposed within the arcuate recess 65 is a head 66 secured to the end of a tubing 67. The tubing 67 communicates with an inner chamber 68 of the mold 51. The head 66 is rotatably contained in the recess 65 by a stepped disk or plate clamp 69 which is bolted as at 70 to the head 62 and whose inner peripheral shoulder engages the rotatable head 66 to prevent the head 66 from becoming disengaged except when the plate 69 is removed. The tubing 67 extends outwardly of the inner cylinder 29 where it is connected to a pressure gauge 71. The pressure gauge 71 has its outlet connected to one end of a tubing 72 whose other end is connected to a vacuum pump 73 whose outlet is connected to one end of a tubing 74. The discharge end of the tubing 74 is connected to a reservoir 75 where water removed from the mold B is collected. The reservoir 75 is vented as at 76.

In order that moisture in the chamber 68 will be suctioned through the bore 64 by the vacuum pump 73, there is provided a threaded vent bore 82 in the plate 62 communicating with a bore 83 in the locking plate 69. A valved vent plug 84 threaded in the bore 82 controls the rate of flow of air entering the chamber 68. The vent plug 84 is provided with an inlet port 85 in the side wall of the pipe 84 connecting a longitudinal bore 86 which communicates with the mold chamber 68. The amount of air permitted to enter the chamber 68 through the vent plug 84 as the vacuum pump 73 is operating is determined by the amount of opening 85 is exposed above the locking plate 69. The maximum air will flow into the chamber 68 when the opening 86 is above the plate 69 and no air will be permitted to flow in the chamber 68 when the vent plug 84 is threaded down completely to engage the top surface of the locking plate 69. By proper adjustment of the vent plug 84, the vacuum pump 73 can operate efficiently to remove all the moisture from the cementitious material in the chamber 68 of the mold 51 as the cementitious material becomes molded properly within the mold 51.

In the normal operation of the molding machine 10, the apparatus is assembled as shown with the mold 51 filled with cementitious material having a high moisture content. The electric motor 24 and the pump 73 are energized to cause the mold device B to rotate rapidly while at the same time the vent plug 84 is adjusted and the desired partial vacuum is created within the chamber 68 of the mold 51. As the mold device B rotates, centrifugal force overcomes gravitational force causing the cementitious material to be ejected away from the center of the mold 51 against the sides of the mold where the cementitious material begins to build up and fill the extremities of the mold. The moisture contained in the mix of cementitious material being of lighter weight than the solid particles constituting the cementitious mixture is forced to the center of the mold and thence upwardly to the bore 64 where a partial vacuum has been created by the combination of vacuum pump 73 and vent plug 84. The water is then drawn out of the chamber 68 and into the reservoir 75 leaving the cementitious material in the mold device B in a dry condition. The centrifugal forces effected by the rapid rotation of the mold device B as well as the partial vacuum created by the vacuum pump 73 and vent plug 84 will displace any air entrapped within the cementitious material and draw off the air as well as the moisture contained in the chamber 68 in the mold 51. Vibrations normally present in rapidly rotating machinery is also prevalent herein and will assist in the movement of the cementitious material outwardly toward the inner mold surface 51.

Since the walls of the mold 51 are made of rubber and the like, the force exerted by the cementitious material being effected by centrifugal force will cause the resilient walls to contract slightly. After the mold device B has stopped rotating and centrifugal force has ceased to exist, the resilient mold 51 now exerts an inward force on the outer surface of the cementitious material forming the statuary or the like being molded. This cementitious material which has taken the shape of the mold 51, is moisture free and has taken an initial set. The inward force of the resilient side walls of the mold 51 tends to further compress the cementitious particles in contact with the mold 51 and increases the density of the molded article at the surface thereof. To stop the rotational movement of the mold device B, the braking mechanism A is actuated upon application of a downward force on the foot pedal 40.

Upon completion of a casting, the molding device B may be readily removed by a simple lifting of the cover plate 62 from the mold 51 and then disengaging the tie bolts C. The mold device B is then lifted from its seat 31. The upper collar 46 is slipped off the mold jacket 50 and the fasteners 54, 55 removed from the flanges 49 of the clamps 53 and 52. The two halves of the mold jacket 50 and mold 51 now separate permitting the release of the casting from the mold 51. The mold device B can now be assembled and returned to its position within the inner drum 29 and recess 31 in the support 50 where it is locked into place by the tie bolts C. The cover plate 62 is then replaced on the mold 51 after the latter has been filled with cementitious material. The motor 24 and the vacuum pump 73 are energized and the cycle of operation described above is repeated. Since insufficient cementitious material can be placed in the mold 51 at one time to produce the article being cast, after a certain interval the motor 24 is stopped and the cover plate 62 removed to permit more cementitious material to be placed in the chamber 68 of the mold 51.

It is readily noted that my molding machine 10 constructed and operated as shown and described herein will produce castings of cementitious material such as statuary and the like wherein the articles produced will be without flaws, entrapped air bubbles and blemishes on the surface thereof. Also, the molding machine will produce articles of intricate design and construction heretofore unable to be cast of cementitious material without the necessity of correcting flaws, etc. The molding machine 10 permits the use of a wet mix which is necessary in order to compel the material to flow into all parts of the mold, yet will cause bubbles and other flaws in the cast article unless removed promptly and completely as occurs in the molding machine 10. The rotational movement of the molding device B can be reversed if desired in order that certain parts of a mold which may extend in asymmetrical fashion thereto may be properly filled with mortar or cementitious material during the casting process.

What I claim as new and desire to secure by Letters Patent of the United States is:

1. A device for casting cementitious material comprising a housing having a base wall and an intermediate wall, said intermediate wall having an opening, a pedestal having a bore mounted on said intermediate wall above said opening, a rotatable shaft mounted on said base wall and extending through said opening and said bore, power operated means connected to said shaft for rotating said shaft, a brake drum mounted on said pedestal, second drum means mounted on the upper end of said rotatable shaft in proximity of said brake drum, inner cylindrical means mounted on said second drum for rotational movement, roller means mounted about the inner surface of said housing and engaging the upper portion of said inner cylindrical means, mold support means, adjustable means mounting said mold support means within said inner cylindrical means and on said second drum means, mold means mounted on said mold support means, cover means for said mold means, vacuum creating means connected to said cover means for removing moisture from said cementitious material and vent means mounted on said cover means for venting said mold means.

2. A device for casting cementitious material comprising a housing having a base wall and an intermediate wall, said intermediate wall having an opening, a pedestal having a bore mounted on said intermediate wall above said opening, a rotatable shaft mounted on said base wall and extending through said opening and said bore, power operated means connected to said shaft for rotating said shaft, a brake drum mounted on said pedestal, second drum means mounted on the upper end of said rotatable shaft in proximity of said brake drum, inner cylindrical means mounted on said second drum for rotational movement, roller means mounted about the inner surface of said housing and engaging the upper portion of said inner cylindrical means, mold support means, adjustable means mounting said mold support means within said inner cylindrical means and on said second drum means, mold means mounted on said mold support means, said mold means having compressible walls, cover means for said mold means, vacuum creating means connected to said cover means for removing moisture from said cementitious material and vent means mounted on said cover means for venting said mold means.

References Cited in the file of this patent

UNITED STATES PATENTS

| 1,510,117 | Von Vass | Sept. 30, 1924 |
| 1,832,066 | Von Webern | Nov. 17, 1931 |
| 2,189,071 | Kopp | Feb. 6, 1940 |
| 2,342,801 | Guerci | Feb. 29, 1944 |
| 2,440,754 | Nagel | May 4, 1948 |
| 2,585,756 | Eschenbrenner | Feb. 12, 1952 |
| 2,625,728 | Eschenbrenner | Jan. 20, 1953 |